United States Patent
Osunkwo et al.

(10) Patent No.: US 11,816,755 B2
(45) Date of Patent: Nov. 14, 2023

(54) PART MANUFACTURE MACHINE HAVING VISION INSPECTION SYSTEM

(71) Applicants: TE Connectivity Services GmbH, Schaffhausen (CH); Tyco Electronics (Shanghai) Co., Ltd., Shanghai (CN)

(72) Inventors: Sonny O. Osunkwo, Harrisburg, PA (US); Lei Zhou, Shanghai (CN)

(73) Assignees: Tyco Electronics Shanghai Co Ltd; TE Connectivity Solutions GmbH

( * ) Notice: Subject to any disclaimer, the term of this patent is extended or adjusted under 35 U.S.C. 154(b) by 460 days.

(21) Appl. No.: 17/082,138

(22) Filed: Oct. 28, 2020

(65) Prior Publication Data
US 2022/0114692 A1    Apr. 14, 2022

(51) Int. Cl.
G06T 1/00 (2006.01)
G06T 7/00 (2017.01)
G05B 19/406 (2006.01)
H04L 67/12 (2022.01)

(52) U.S. Cl.
CPC .......... G06T 1/0014 (2013.01); G05B 19/406 (2013.01); G06T 7/0004 (2013.01); H04L 67/12 (2013.01); G05B 2219/37208 (2013.01); G06T 2207/30164 (2013.01)

(58) Field of Classification Search
CPC ......... G06T 1/0014; G06T 2207/30164; G06T 7/0004; G06T 5/00; G06T 2201/00; G05B 11/00; G05B 23/00; G05B 2219/00; H04L 1/00; H04L 43/00; H04L 2463/00
See application file for complete search history.

(56) References Cited

U.S. PATENT DOCUMENTS

| | | | |
|---|---|---|---|
| 2002/0009220 A1* | 1/2002 | Tanaka | G06T 7/0002 382/150 |
| 2002/0180960 A1* | 12/2002 | Koren | G01N 21/8803 356/237.2 |
| 2004/0071335 A1* | 4/2004 | Vilella | H04N 7/185 382/145 |
| 2019/0089932 A1* | 3/2019 | Oostendorp | H04N 7/181 |
| 2019/0124807 A1* | 4/2019 | Deng | H05K 13/0813 |
| 2019/0236772 A1* | 8/2019 | Cho | G06N 3/08 |

* cited by examiner

*Primary Examiner* — Kidest Bahta

(57) ABSTRACT

A vision inspection system includes an imaging device that is configured to image parts being inspected. The vision inspection system includes a vision inspection controller that is configured to be communicatively coupled to a machine controller of the part manufacture machine by a communication network. The vision inspection controller communicates with the communication network using a first communication protocol. The vision inspection controller creates an absolute path directory at the machine controller. The vision inspection controller receives an image from the imaging device. The vision inspection controller communicates a first trigger to the absolute path directory upon receipt of the image from the imaging device. The vision inspection controller processes the image from the imaging device to determine inspection results for a first part of the parts. The vision inspection controller sends at least one of the image or the inspection results to the machine controller.

19 Claims, 3 Drawing Sheets

PART MANUFACTURE MACHINE HAVING VISION INSPECTION SYSTEM

CROSS REFERENCE TO RELATED APPLICATIONS

This application claims benefit to Chinese Application No. 202011073652.X, filed 9 Oct. 2020, the subject matter of which is herein incorporated by reference in its entirety.

BACKGROUND OF THE INVENTION

The subject matter herein relates generally to part manufacture machines.

Inspection systems are used for inspecting parts or products during a manufacturing process to detect defective parts or products. Conventional inspection systems use personnel to manually inspect parts. Such manual inspection systems are labor intensive and high cost. The manual inspection systems have low detection accuracy leading to poor product consistency. Additionally, manual inspection systems suffer from human error due to fatigue, such as missed defects, wrong counts, misplacing of parts, and the like. Some known inspection systems use machine vision for inspecting parts or products. The machine vision inspection system use cameras to image the parts or products. However, vision inspection may be time consuming. Hardware and software for operating the vision inspection machines is expensive. Additionally, the part manufacture machine may be controlled based on input from the machine vision inspection system. However, communication between the components of the part manufacture machine may be limited, such as when the components use different communication protocols.

A need remains for a communication network for a vision inspection system of a part manufacture machine.

BRIEF DESCRIPTION OF THE INVENTION

In one embodiment, a vision inspection system for a part manufacture machine is provided. The vision inspection system includes an imaging device that is configured to image parts being inspected. The vision inspection system includes a vision inspection controller that is configured to be communicatively coupled to a machine controller of the part manufacture machine by a communication network. The vision inspection controller communicates with the communication network using a first communication protocol. The vision inspection controller creates an absolute path directory at the machine controller. The vision inspection controller receives an image from the imaging device. The vision inspection controller communicates a first trigger to the absolute path directory upon receipt of the image from the imaging device. The vision inspection controller processes the image from the imaging device to determine inspection results for a first part of the parts. The vision inspection controller sends at least one of the image or the inspection results to the machine controller.

In another embodiment, a part manufacture machine is provided. The part manufacture machine includes a machine motive device movable between a first position and a second position. The part manufacture machine includes a machine controller operably coupled to the machine motive device. The machine controller controls operation of the machine motive device causing movement of the machine motive device between the first position and the second position. The machine controller is communicatively coupled to a communication network. The part manufacture machine includes a vision inspection system. The vision inspection system includes an imaging device and a vision inspection controller. The imaging device is configured to image parts being inspected. The vision inspection controller is communicatively coupled to the machine controller by the communication network. The vision inspection controller communicates with the communication network using a first communication protocol. The vision inspection controller creates an absolute path directory at the machine controller. The vision inspection controller receives an image from the imaging device. The vision inspection controller communicates a first trigger to the absolute path directory upon receipt of the image from the imaging device. The vision inspection controller processes the image from the imaging device to determine inspection results for the parts. The vision inspection controller sends at least one of the image or the inspection results to the machine controller. The machine controller reads the absolute path directory at intervals to detect the first trigger. The machine controller activates the machine motive device when the first trigger is detected at the absolute path directory.

In a further embodiment, a method of inspecting parts is provided. The method establishes a communication network between a vision inspection controller of a vision inspection system and a machine controller associated with the vision inspection system. The method images a part using an imaging device of the vision inspection system. The method receives the image of the part from the imaging device at the vision inspection controller. The method creates an absolute path directory at the machine controller. The method communicates a first trigger on the communication network from the vision inspection controller to the absolute path directory upon receipt of the image from the imaging device. The method processes the image from the imaging device at the vision inspection controller to determine inspection results for the parts. The method communicates at least one of the image or the inspection results on the communication network to the machine controller. The machine controller reads the absolute path directory at intervals to detect the first trigger. The machine controller activates a machine motive device when the first trigger is detected at the absolute path directory.

DETAILED DESCRIPTION OF THE INVENTION

Figure 1:
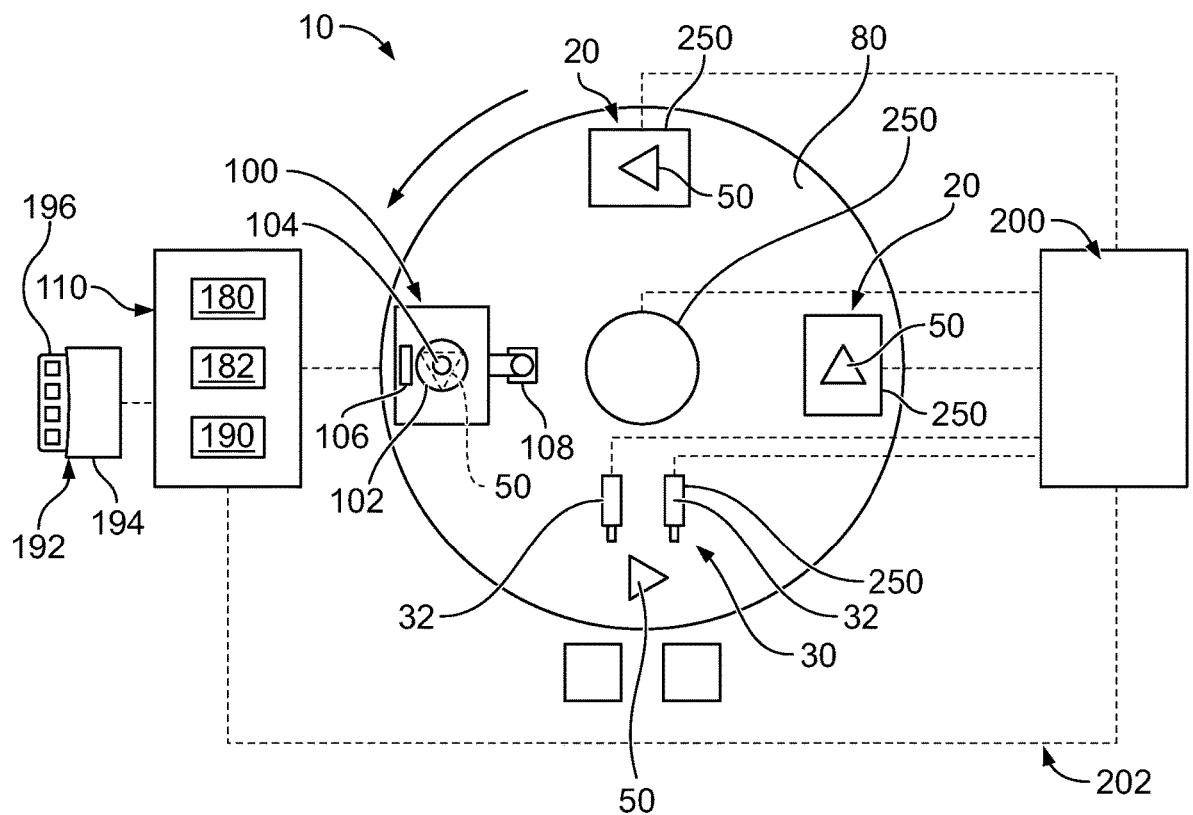
FIG. 1 is a schematic illustration of a part manufacture machine for manufacturing parts, such as from a plurality of parts or pieces in accordance with an exemplary embodiment.

FIG. 1 is a schematic illustration of a part manufacture machine 10 for manufacturing products or parts 50, such as from a plurality of parts or pieces. The parts 50 may be formed by the part manufacture machine 10, such as being molded, stamped, formed or other manufacture process by the part manufacture machine 10. The parts 50 may be assembled together by the part manufacture machine 10. In other various embodiments, the parts 50 may be presented or transferred to the part manufacture machine 10. In an exemplary embodiment, the part manufacture machine 10 includes one or more stations 20 used to form and/or assemble the various pieces into the parts 50. In various embodiments, the parts 50 are electrical connectors. For example, the parts may include contacts, housings, circuit boards, or other types of parts. The machine 10 may be used for manufacturing parts used in other industries in alternative embodiments.

The part manufacture machine 10 includes a vision inspection system 100 used to inspect the various parts 50. The parts 50 are transported to the vision inspection system 100, such as between the stations 20 and the vision inspection system 100. The vision inspection system 100 is used for quality inspection of the parts 50. The part manufacture machine 10 may be operated to remove defective parts 50 for scrap or further inspection based on input from the vision inspection system 100. The acceptable parts 50 that have passed inspection by the vision inspection system 100 may be transported away from the part manufacture machine 10, such as to a bin or another machine for further assembly or processing.

The part manufacture machine 10 includes a platform 80 that supports the parts 50 and may be used to move the parts 50 between the various stations. The platform 80 may include a plate or tray having an upper surface that supports the parts 50. The platform 80 may include fixturing elements used to support and position the part 50 relative to the platform 80. The platform 80 may be used to move the parts 50 to the vision inspection system 100. The platform 80 may be used to transfer the parts 50 from the vision inspection system 100 to a part removal station 30 where the parts 50 are removed. In an exemplary embodiment, the part removal station 30 may be used to separate acceptable parts 50 from defective parts 50, such as by separating the parts 50 into different bins.

The vision inspection system 100 includes one or more imaging devices 102 that image the parts 50 on the platform 80 within a field of view of the imaging device(s) 102. The vision inspection system 100 includes a vision inspection controller 110 that receives the images from the imaging device 102 and processes the images to determine inspection results. For example, the vision inspection controller 110 determines if the part(s) 50 passes or fails inspection. The vision inspection controller 110 may reject parts 50 that are defective. In an exemplary embodiment, the vision inspection controller 110 includes a shape recognition tool configured to recognize the parts 50 in the field of view, such as boundaries of the parts 50 and relative positions of the parts 50. In an exemplary embodiment, the vision inspection controller 110 includes an artificial intelligence (AI) learning module used to customize and configure image analysis based on the images received from the imaging device 102. The vision inspection controller 110 may be updated and trained in real time during operation of the vision inspection system 100.

In various embodiments, after the parts 50 are inspected, the parts 50 are transferred to the part removal station 30 where the parts 50 are removed from the platform 80. The part removal station 30 may include one or more part removal devices 32 for removing the parts 50 from the platform 80. In an exemplary embodiment, the part removal station 30 may be used to separate acceptable parts 50 from defective parts 50 based on inspection results determined by the vision inspection controller 110. The part removal devices 32 may include ejectors, such as vacuum ejectors for picking up and removing the parts 50 from the platform 80. The part removal devices 32 may include ejectors, such as pushers for removing the parts 50 from the platform 80. The pushers may be mechanical pushers, such as electrically or pneumatically operated pushers, for removing the parts 50 from the platform 80. The part removal devices 32 may include a multi-axis robot manipulator configured to grip and pick the parts 50 off of the platform 80.

In an exemplary embodiment, the part manufacture machine 10 includes one or more machine motive devices 250 operable to control various components of the part manufacture machine. The machine motive devices 250 are actuated during operation of the part manufacture machine 10. The machine motive devices 250 may be operated to move the imaging device 102. For example, in various embodiments, a machine motive device 250 may be operably coupled to the camera and/or the lens and/or the lighting device of the imaging device 102, such as to move or control the imaging device 102. The machine motive device 250 may move the camera to a different location. The machine motive device 250 may move the camera closer to or further from the platform 80. The machine motive device 250 may control the focus of the lens, such as translating, rotating, or otherwise moving the lens. The machine motive device 250 may move the lighting device, such as to change the lighting angle. The machine motive devices 250 may be operated to move other components of the part manufacture machine 10 in other various embodiments. For example, the machine motive device 250 may be operably coupled to the platform 80 to move the platform 80, such as to advance the platform 80, to rotate the platform 80, to vibrate the platform 80, or to control other movements of the platform 80. The machine motive device 250 may be operably coupled to the assembling station 20, such as to assemble pieces to form the part 50. In other various embodiments, the machine motive devices 250 may be operated to move the parts 50. For example, the machine motive device 250 may be operably coupled to the part removal devices 32 actuating the part removal devices 32 based on the inspection results.

The part manufacture machine 10 includes a machine controller 200 operably coupled to the machine motive devices 250 for controlling operation of the machine motive devices 250. The machine controller 200 is communicatively coupled to the vision inspection controller 110 through a communication network 202, such as a TCP/IP network. The machine controller 200 may provide outputs to the vision inspection controller 110. The machine controller 200 may receive inputs from the vision inspection controller 110. For example, in various embodiments, operation of the part manufacture machine 10 may be controlled based on input from the vision inspection controller 110. The machine motive devices 250 may be controlled or activated based on the images by the vision inspection controller 110. In an exemplary embodiment, the vision inspection controller 110 communicates triggering events, such as image capture by the imaging device 102, to the machine controller 200, which initiates operation of other components of the machine controller 200, such as activation of the machine motive devices 250.

In an exemplary embodiment, the vision inspection controller 110 and the machine motive devices 250 operate on the same local environment (for example, computer system), such as the machine controller 200. The local environment enables communication between the vision inspection controller 110 and the machine motive devices 250. The vision inspection controller 110 and the machine motive devices 250 may have different communication protocols such that the vision inspection controller 110 and the machine motive devices 250 are unable to directly communicate. However, the machine controller 200 is able to communicate with the vision inspection controller 110 and with the machine motive devices 250, allowing triggering or activation of the machine motive devices 250 when the vision inspection controller 110 is operated (for example, when the image is captured).

In an exemplary embodiment, the vision inspection system 100 includes the imaging device 102, a lens 104, and a lighting device 106 arranged adjacent an imaging area above the platform 80 to image the parts 50. The lens 104 is used to focus the images. The lighting device 106 controls lighting of the parts 50 at the imaging area. The imaging device 102 may be a camera, such as a high-speed camera. Optionally, the vision inspection system 100 may include multiple imaging devices 102 to image the parts from different angles or for imaging different parts 50.

In an exemplary embodiment, the imaging device 102 is mounted to a position manipulator 108 for moving the imaging device 102 relative to the platform 80. The position manipulator 108 may be an arm or a bracket that supports the imaging device 102. In various embodiments, the position manipulator 108 may be positionable in multiple directions, such as in two-dimensional or three-dimensional space. The position manipulator 108 is operably coupled to one of the machine motive devices 250 to control positioning of the position manipulators 108. The position manipulator 108 may be automatically adjusted by the machine motive device 250 operated by the machine controller 200. The position manipulator 108 may be adjusted to image a different part 50 or to image the same part from a different angle. The position of the imaging device 102 may be adjusted based on the types of parts 50 being imaged. For example, when a different type of part 50 is being imaged, the imaging device 102 may be moved based on the type of part being imaged.

The imaging device 102 communicates with the vision inspection controller 110 through machine vision software to process the data, analyze results, record findings, and make decisions based on the information. The vision inspection controller 110 provides consistent and efficient inspection automation. The vision inspection controller 110 determines the quality of manufacture of the parts 50, such as determining if the parts 50 are acceptable or are defective. The vision inspection controller 110 identifies defects in the parts 50, when present. For example, the vision inspection controller 110 may determine if the parts 50 are damaged during assembly. The vision inspection controller 110 may determine if the parts 50 are correctly assembled, such as that the pieces being in proper orientations relative to each other.

The vision inspection controller 110 receives the images from the imaging device 102 and processes the images to determine inspection results. In an exemplary embodiment, the vision inspection controller 110 includes one or more processors 180 for processing the images. The vision inspection controller 110 determines if the part 50 passes or fails inspection. In an exemplary embodiment, the part removal devices 32 are controlled by the machine controller 200, based on the images or inputs from the vision inspection controller 110, to remove the parts 50. For example, the machine controller 200 activates the machine motive devices 250 associated with the part removal devices 32 based on the images or the inspection results generated by the vision inspection controller 110. The acceptable parts and/or the defective parts are moved into different collection bins (for example, a pass bin and a fail bin) by the part removal devices 32.

In an exemplary embodiment, the vision inspection controller 110 includes a shape recognition tool 182 configured to recognize the parts 50 in the field of view. The shape recognition tool 182 is able to recognize and analyze the image of the part 50. The shape recognition tool 182 may be used to identify edges, surfaces, boundaries and the like of the parts 50. Once the images are received, the images are processed based on an image analysis model. The images are compared to the image analysis model to determine if the part 50 has any defects. The images may be processed to detect damage, improper orientation, partial assembly, full assembly, over-assembly, dirt, debris, dents, scratches, or other types of defects. The images may be processed by performing pattern recognition of the images based on the image analysis model. The shape recognition tool 182 compare patterns or features in the images to patterns or features in the image analysis model. The images may be processed by performing feature extraction of boundaries and surfaces detected in the images and comparing the boundaries and surfaces to the image analysis model. The shape recognition tool 182 may identify lines, edges, bridges, grooves, or other boundaries or surfaces within the image.

In an exemplary embodiment, the vision inspection controller 110 may perform pre-processing of the image data. For example, the vision inspection controller 110 may perform contrast enhancement and/or noise reduction of the images during processing. The vision inspection controller 110 may perform image segmentation during processing. For example, the vision inspection controller may crop the image to an area of interest or mask areas of the image outside of the area of interest, thus reducing the data that is processed by the vision inspection controller 110. The vision inspection controller 110 may identify areas of interest within the image for enhanced processing.

In an exemplary embodiment, the vision inspection controller 110 includes an artificial intelligence (AI) learning module 190. The AI learning module 190 uses artificial intelligence to train the vision inspection controller 110 and improve inspection accuracy of the vision inspection controller 110. The AI learning module 190 customizes and configures image analysis based on the images received from the imaging device 102. The vision inspection controller 110 is updated and trained in real time during operation of the vision inspection system 100. The AI learning module 190 of the vision inspection controller 110 may be operable in a learning mode to train the vision inspection controller 110 and develop the image analysis model. The image analysis model changes over time based on input from the AI learning module 190 (for example, based on images of the parts 50 taken by the imaging device 102).

In an exemplary embodiment, the vision inspection controller 110 includes a user interface 192. The user interface 192 includes a display 194, such as a monitor. The user interface 192 includes one or more inputs 196, such as a keyboard, a mouse, buttons, and the like. An operator is able to interact with the vision inspection controller 110 with the user interface 192.

Figure 2:
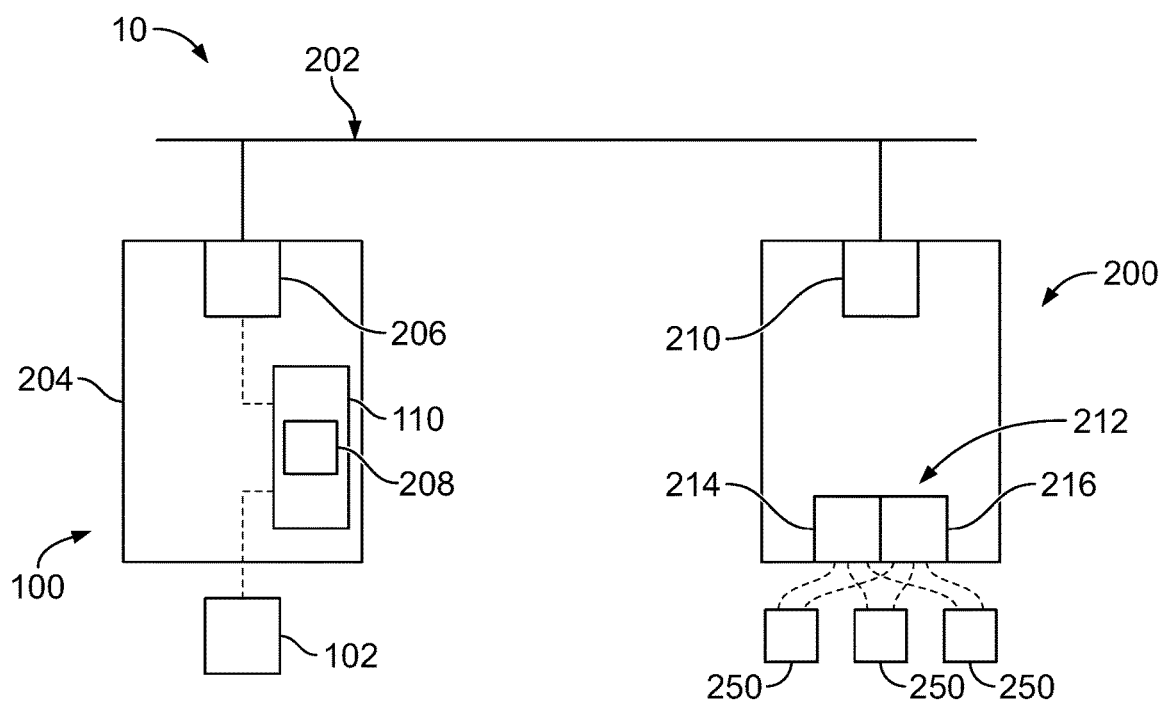
FIG. 2 illustrates a control architecture for the part manufacture machine in accordance with an exemplary embodiment.

FIG. 2 illustrates a control architecture for the part manufacture machine 10. In an exemplary embodiment, the part manufacture machine 10 includes the machine controller 200 for controlling operation of various components of the machine 10. The machine controller 200 communicates with the vision inspection system 100 through the communication network 202, such as a TCP/IP network.

The vision inspection system 100 may be embodied in a computer 204. The vision inspection controller 110 may be provided on the computer 204. The vision inspection system 100 includes a communication module 206 coupled to the communication network 202. The vision inspection controller 110 is communicatively coupled to the communication module 206, such as to communicate with the machine controller 200 or other component. The imaging device 102 is coupled to the vision inspection system 100. The vision inspection controller 110 includes a graphics processing unit (GPU) 208 for processing the images from the imaging device 102.

The machine controller 200 includes a communication module 210 coupled to the communication network 202. The machine controller 200 communicates with the vision inspection controller 110 through the communication network 202. The machine controller 200 includes an I/O module 212 having an input 214 and an output 216. The machine controller 200 is coupled to the machine motive devices 250 through the I/O module 212. The machine controller 200 may be coupled to multiple machine motive devices 250.

Figure 3:
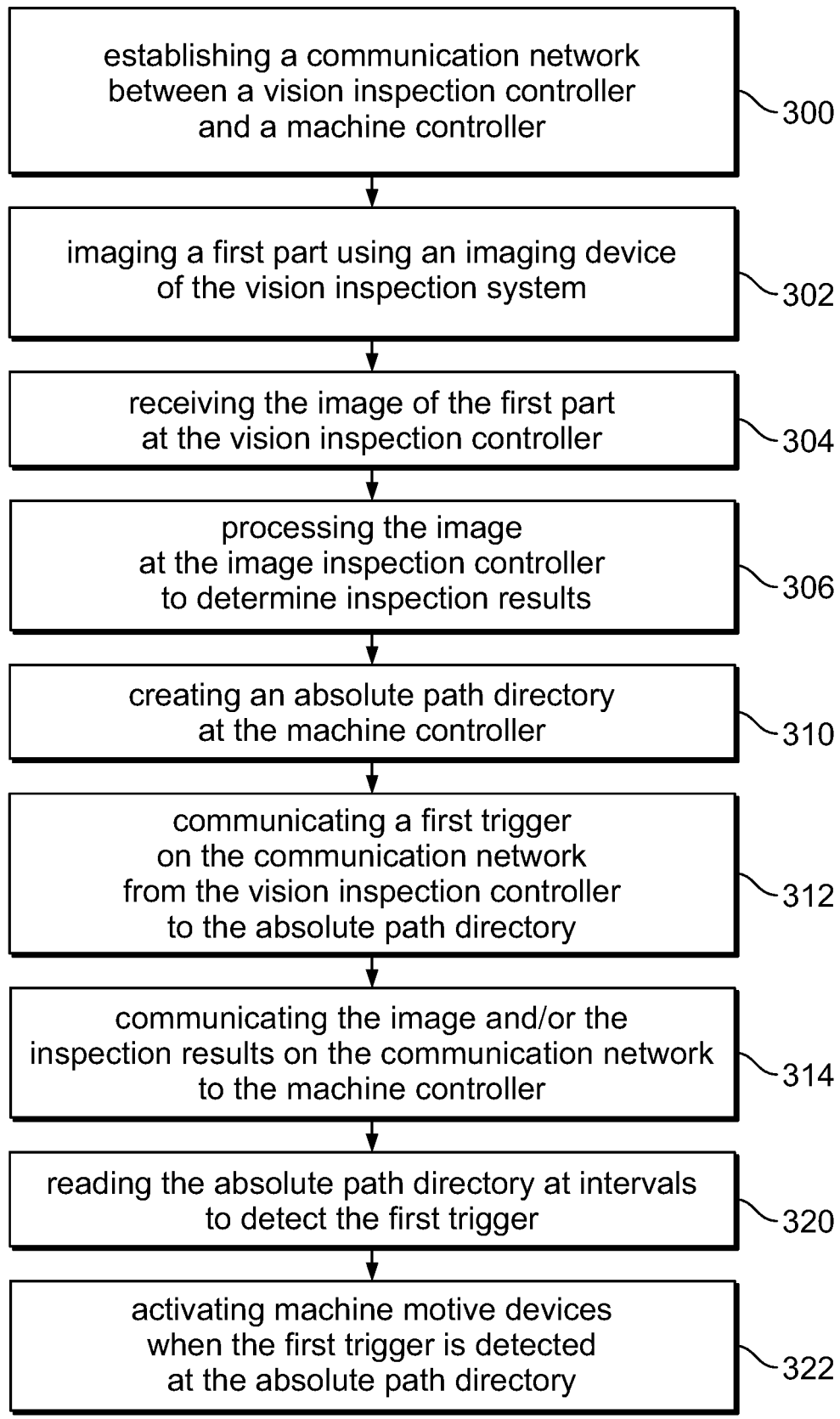
FIG. 3 is a flow chart showing a method of inspecting parts in accordance with an exemplary embodiment.

FIG. 3 is a flow chart showing a method of inspecting parts in accordance with an exemplary embodiment. The method, at 300, includes establishing the communication network 202 between the vision inspection controller 110 and the machine controller 200. The vision inspection controller 110 may communicate in accordance with a first communication protocol. The machine controller 200 may communicate in accordance with a second communication protocol, which may be different than the first communication protocol.

At 302, the method includes imaging a first part 50 using the imaging device 102 of the vision inspection system 100. At 304, the method includes receiving the image of the first part 50 from the imaging device 102 at the vision inspection controller 110. At 306, the method includes processing the image from the imaging device at the vision inspection controller 110 to determine inspection results for the first part 50. The image may be processed based on an image analysis model to determine the inspection results for the part 50. The vision inspection controller 110 may include a shape recognition tool 182 used to analyze the images of the parts 50. In various embodiments, the images are processed by comparing the image to the image analysis model to determine if the part 50 has any defects. In various embodiments, the images are processed by performing pattern recognition of the images based on the image analysis model. In various embodiments, the images are processed by performing feature extraction of boundaries and surfaces detected in the images and comparing the boundaries and surfaces to the image analysis model. The method may include customizing the image analysis model using the AI learning module 190 to configure the image analysis model based on the images received from the imaging device 102. The image analysis model is updated based on the images from the imaging device 102.

At 310, the method includes creating an absolute path directory at the machine controller 200. The absolute path directory may be created by the vision inspection controller 110 and communicated to the machine controller 200 via the communication network 202. The absolute path directory may be communicated upon a triggering event, such as upon the image being received at the vision inspection controller 110. The absolute path directory may be a text file at a generic location in a file system of the machine controller 200. At 312, the method includes communicating a first trigger on the communication network 202 from the vision inspection controller 110 to the absolute path directory upon receipt of the image from the imaging device. The first trigger may be a binary number. At 314, the method includes communicating at least one of the image or the inspection results on the communication network 202 to the machine controller 200.

At 320, the method includes reading the absolute path directory at intervals to detect the first trigger. The machine controller 200 may read the absolute path directory to detect the first trigger. For example, the machine controller 200 may look for the binary number to detect the triggering event. At 322, the method includes activating the machine motive device(s) 250 when the first trigger is detected at the absolute path directory. In various embodiments, the machine motive device 250 may be used to control the part removal device 32. The machine motive device 250 may be activated to remove the part. In various embodiments, the machine motive device 250 may be used to control the position manipulator 108 used to position the imaging device 102. The machine motive device 250 may be activated to move the imaging device 102. In various embodiments, the machine motive device 250 may be used to move the platform 80, such as to move the parts between the stations. The machine motive device 250 may be activated to move the platform 80. Other types of machine motive devices 250 may be provided to control other components of the part manufacture machine 10.

The part manufacture machine 10 may be used to image other parts. For example, the method may include imaging a second part using the imaging device, receiving the second image of the second part at the vision inspection controller, processing the second image at the vision inspection controller, communicating a second trigger on the communication network from the vision inspection controller upon receipt of the second image from the imaging device, reading the absolute path directory to detect the second trigger and activating the machine motive device when the second trigger is detected at the absolute path directory. In various embodiments, the second trigger may be communicated to the absolute path directory and the machine controller may read the absolute path directory looking for the different triggers, such as looking for a change in the binary number. In other various embodiments, a second absolute path directory may be created and the machine controller may read the second absolute path directory to look for the second trigger.

Figure 4:
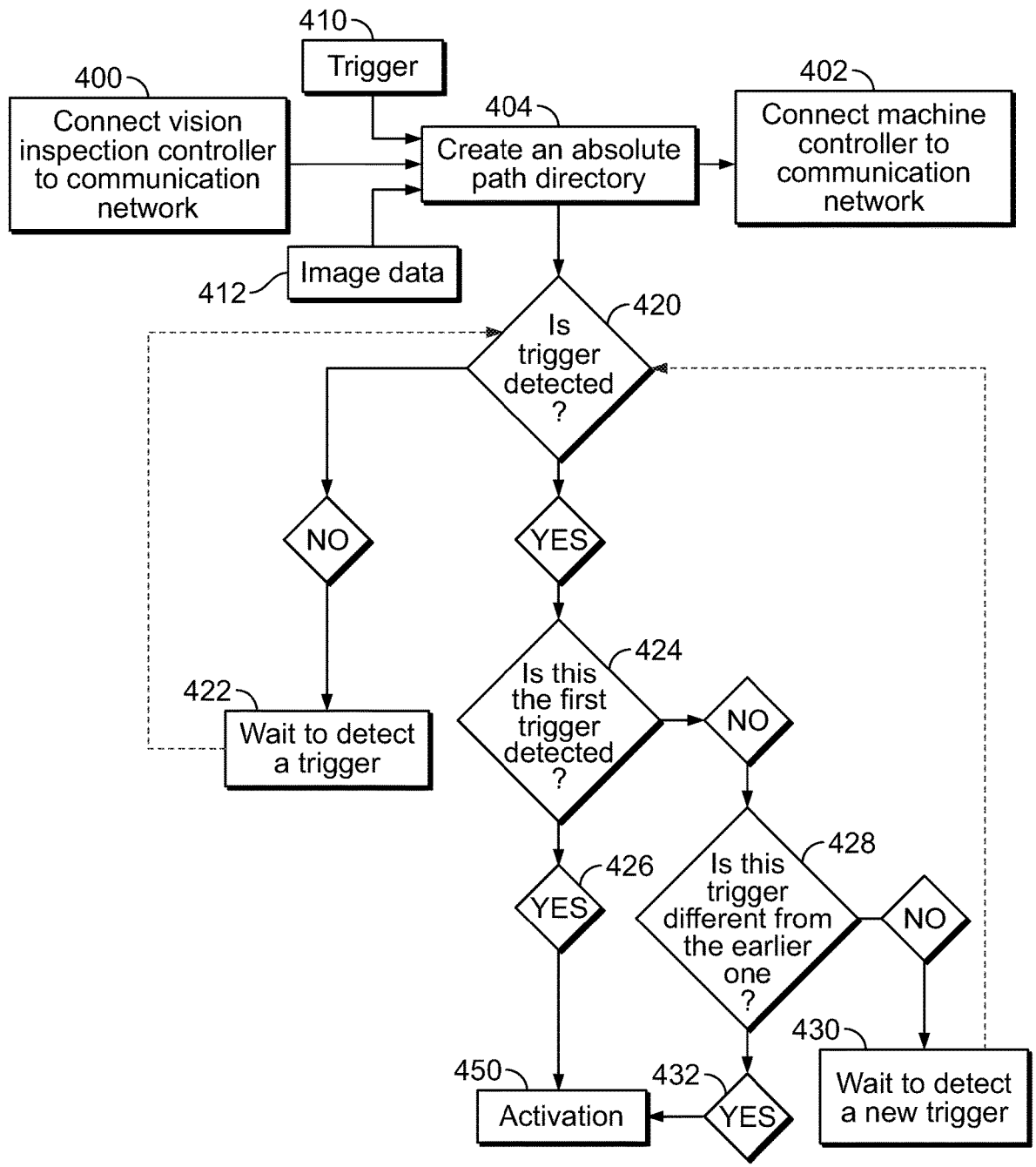
FIG. 4 is a flow chart showing a method of communicating between a first controller and a second controller on the same local environment in accordance with an exemplary embodiment.

FIG. 4 is a flow chart showing a method of communicating between a first controller and a second controller on the same local environment in accordance with an exemplary embodiment. The method of communicating allows communication of a first script running on the first controller and communication of a second script running on the second controller. The first and second controllers may be operated on a common computer system. The method of communicating may be used as steps of the method of inspecting parts described in FIG. 3. The method of communicating may be performed for operating the part manufacturing machine 10, such as for communicating between the machine controller 200 and the vision inspection controller 110.

At 400, the method includes connecting the vision inspection controller 110 to the communication network 202. At 402, the method includes connecting the machine controller 200 to the communication network 202. At 404, the method includes creating an absolute path directory. The absolute path directory may be created on the local environment, such as on the computer system. The absolute path directory may be a text file at a generic location in a file system of the computer system. The absolute path directory may be created by the vision inspection controller 110 and communicated via the communication network 202. In other various embodiments, the absolute path directory may be created by the machine controller 200. In other various embodiments, the absolute path directory may be created by another component or preloaded on the local environment. The absolute path directory may be communicated upon a triggering event, such as upon the image being received at the vision inspection controller 110.

At 410, the method includes communicating a trigger on the communication network 202 from the vision inspection controller 110 to the absolute path directory upon receipt of an image from the imaging device. The trigger is associated with a triggering event, such as the capture of the image and/or the receipt of the image from the imaging device. The vision inspection controller 110 writes a data entry to the appropriate file at the absolute path directory. The data entry associated with the trigger may be a text entry to the file. The data entry may be a binary number. At 412, the method includes communicating image data on the communication network 202 to the absolute path directory. The image data may be the image or the image data may be the inspection results relating to the image. The image data may be automatically written to the absolute path directory when received or generated at the vision inspection controller 110.

At 420, the method includes reading the absolute path directory with the machine controller 200. The machine controller 200 may read the absolute path at regular intervals. The machine controller 200 determines if the trigger is detected at the absolute path directory. For example, the machine controller 200 determines if the binary number is detected. At 422, if the trigger is not detected, the machine controller 200 waits the interval and re-reads the absolute path directory. At 424, if the trigger is detected, the machine controller 200 determines if the trigger is the first trigger detected. For example, the machine controller 200 determines if the trigger is the first binary number detected at the absolute path directory. At 426, if the trigger is the first trigger detected, the method includes activating 450 the machine motive device(s) 250. At 428, if the trigger is not the first trigger detected, the machine controller 200 determines if the trigger is different from the previous trigger. At 430, if the trigger is the same as the previous trigger, the machine controller 200 waits the interval and re-reads the absolute path directory. At 432, if the trigger is different than the previous trigger, the machine controller 200, the method includes activating 450 the machine motive device(s) 250.

As such, using the communication method allows activation of the machine motive devices 250 based on a triggering event, such as capturing of an image. In various embodiments, the machine motive device 250 may be used to control other aspects of the part manufacture machine 10. For example, the machine motive device 250 may be used to control the part removal device 32. The machine motive device 250 may be activated to remove the part. In various embodiments, the machine motive device 250 may be used to control the position manipulator 108 used to position the imaging device 102. The machine motive device 250 may be activated to move the imaging device 102. In various embodiments, the machine motive device 250 may be used to move the platform 80, such as to move the parts between the stations. The machine motive device 250 may be activated to move the platform 80. Other types of machine motive devices 250 may be provided to control other components of the part manufacture machine 10.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vision inspection system for a part manufacture machine, the vision inspection system comprising:
an imaging device configured to image parts being inspected;
a vision inspection controller configured to be communicatively coupled to a machine controller of the part manufacture machine by a communication network, the vision inspection controller communicating with the communication network using a first communication protocol, the vision inspection controller creating an absolute path directory at the machine controller, the vision inspection controller receiving an image from the imaging device, the vision inspection controller communicating a first trigger to the absolute path directory upon receipt of the image from the imaging device, the vision inspection controller processing the image from the imaging device to determine inspection results for the part in the image, the vision inspection controller sending at least one of the image or the inspection results to the machine controller; and
a machine motive device operably coupled to a machine controller, the machine controller communicatively coupled to the communication network, the machine controller causing the machine motive device to move when the trigger is read at the absolute path directory;
wherein the vision inspection controller causes the imaging device to take a new image after the machine motive device is moved sending a new trigger to the absolute path directory; and
wherein the machine controller causes the machine motive device to move again when the new trigger is read at the absolute path directory.

2. The vision inspection system of claim 1, wherein the vision inspection controller sends at least one of the image or the inspection results to the absolute path directory of the machine controller.

3. The vision inspection system of claim 1, wherein the vision inspection controller communicates a second trigger to the absolute path directory upon receipt of a second image of a second part of the parts from the imaging device, the vision inspection controller processing the second image from the imaging device to determine second inspection results for the second part, the vision inspection controller sending at least one of the second image or the second inspection results to the machine controller.

4. The vision inspection system of claim 1, wherein the trigger is a first binary number and the new trigger is a second binary number different from the first binary number.

5. The vision inspection system of claim 1, wherein the absolute path directory includes a text file sent on the communication network to a generic location in a file system of the machine controller.

6. A part manufacture machine comprising:
a machine motive device movable between a first position and a second position;
a machine controller operably coupled to the machine motive device, the machine controller controlling operation of the machine motive device causing movement of the machine motive device between the first position and the second position, the machine controller communicatively coupled to a communication network; and
a vision inspection system including an imaging device and a vision inspection controller, the imaging device configured to image parts being inspected, the vision inspection controller communicatively coupled to the machine controller by the communication network, the vision inspection controller communicating with the communication network using a first communication protocol, the vision inspection controller creating an absolute path directory at the machine controller, the vision inspection controller receiving an image from the imaging device, the vision inspection controller communicating a first trigger to the absolute path directory upon receipt of the image from the imaging device, the vision inspection controller processing the image from the imaging device to determine inspection results for the parts, the vision inspection controller sending at least one of the image or the inspection results to the machine controller;
wherein the machine controller reads the absolute path directory at intervals to detect the first trigger, the machine controller activating the machine motive device when the first trigger is detected at the absolute path directory; and
wherein the vision inspection controller communicates a second trigger to the absolute path directory upon receipt of a second image from the imaging device, the machine controller reading the absolute path directory at intervals to detect the second trigger, the machine controller activating the machine motive device when the second trigger is detected at the absolute path directory.

7. The part manufacture machine of claim 6, wherein the vision inspection controller creates a second absolute path directory and communicates the second trigger to the second absolute path directory, the machine controller reading the second absolute path directory at intervals to detect the second trigger, the machine controller activating the machine motive device when the second trigger is detected at the second absolute path directory.

8. The part manufacture machine of claim 6, wherein the first trigger is a first binary number, the second trigger being a second binary number different from the first binary number, the machine controller reading the absolute path directory at intervals to detect a change from the first binary number to the second binary number, the machine controller activating the machine motive device when the machine controller detects the change from the first binary number to the second binary number.

9. The part manufacture machine of claim 6, wherein the absolute path directory includes a text file at a generic location in a file system of the machine controller.

10. The part manufacture machine of claim 6, wherein the machine motive device is coupled to the imaging device, the machine controller activating the machine motive device to move the imaging device to a new position.

11. The part manufacture machine of claim 6, wherein the machine motive device is coupled to a part removal device, the machine controller activating the part removal device to remove the part from the part manufacture machine.

12. A method of inspecting parts comprising:
establishing a communication network between a vision inspection controller of a vision inspection system and a machine controller associated with the vision inspection system;
imaging a part using an imaging device of the vision inspection system;
receiving the image of the part from the imaging device at the vision inspection controller;
creating an absolute path directory at the machine controller;
communicating a first trigger on the communication network from the vision inspection controller to the absolute path directory upon receipt of the image from the imaging device;
processing the image from the imaging device at the vision inspection controller to determine inspection results for the parts;
communicating at least one of the image or the inspection results on the communication network to the machine controller;
the machine controller reading the absolute path directory at intervals to detect the first trigger;
the machine controller activating a machine motive device when the first trigger is detected at the absolute path directory;
imaging a second part using the imaging device, receiving the second image of the second part at the vision inspection controller;
communicating a second trigger on the communication network from the vision inspection controller to the absolute path directory upon receipt of the second image from the imaging device;
the machine controller reading the absolute path directory to detect the second trigger; and
the machine controller activating the machine motive device when the second trigger is detected at the absolute path directory.

13. The method of claim 12, wherein said creating the absolute path directory comprises creating a text file at a generic location in a file system of the machine controller.

14. The method of claim 12, wherein said communicating the at least one of the image or the inspection results comprises communicating the at least one of the image or the inspection results on the communication network to the absolute path directory at the machine controller.

15. The method of claim 12, wherein said communicating the first trigger comprises communicating a binary number to the absolute path directory.

16. The method of claim 12, further comprising imaging a second part using the imaging device, receiving the second image of the second part at the vision inspection controller, creating a second absolute path directory at the machine controller, communicating the second trigger on the communication network from the vision inspection controller to the second absolute path directory upon receipt of the second image from the imaging device, the machine controller reading the second absolute path directory to detect the second trigger and the machine controller activating the machine motive device when the second trigger is detected at the second absolute path directory.

17. The method of claim 12, wherein said activating the machine motive device comprises activating the machine motive device to remove the part.

18. The method of claim 12, further comprising customizing an image analysis model using an artificial intelligence learning module to configure the image analysis model based on the images received from the imaging device, said processing the image comprises processing the image using the image analysis model.

19. The method of claim 12, wherein said activating the machine motive device comprises activating the machine motive device to move the imaging device to a new position.

\* \* \* \* \*